US008606251B2

(12) United States Patent
Dunko et al.

(10) Patent No.: US 8,606,251 B2
(45) Date of Patent: Dec. 10, 2013

(54) MOBILE TERMINALS, METHODS AND COMPUTER PROGRAM PRODUCTS INCORPORATING PODCAST LINK ACTIVATION CONTROL

(75) Inventors: Gregory A. Dunko, Cary, NC (US);
Jeffrey Jason Griffin, Raleigh, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2206 days.

(21) Appl. No.: 11/315,867

(22) Filed: Dec. 22, 2005

(65) Prior Publication Data

US 2007/0149183 A1 Jun. 28, 2007

(51) Int. Cl.
*H04M 3/00* (2006.01)

(52) U.S. Cl.
USPC .......................................... 455/418; 370/338

(58) Field of Classification Search
USPC .............................................. 455/90.1, 575.1
See application file for complete search history.

(56) References Cited

U.S. PATENT DOCUMENTS

| 2001/0049296 | A1* | 12/2001 | Lee et al. ...................... 455/566 |
| 2004/0148638 | A1 | 7/2004 | Weisman et al. |
| 2005/0064887 | A1 | 3/2005 | Bengtsson et al. |
| 2007/0106760 | A1* | 5/2007 | Houh et al. .................... 709/219 |
| 2007/0110010 | A1* | 5/2007 | Kotola et al. .................. 370/338 |
| 2007/0118853 | A1* | 5/2007 | Kreitzer et al. ................. 725/46 |

FOREIGN PATENT DOCUMENTS

| JP | 2005-525628 | 8/2005 |
| WO | WO 2004/029756 A2 | 4/2004 |

OTHER PUBLICATIONS

Ghini et al., Smart Download on the Go: A Wireless Internet Application for Music Distribution over Heterogeneous Networks, IEEE Communications Society, 2004, pp. 73-79.
Notification of Transmittal of the International Search Report and the Written Opinion of the International Searching Authority, or the Declaration, PCT/US2006/031003, Nov. 29, 2006.
Examination and Search Report Corresponding to Malaysian Patent Application No. PI 20081857; Date of Mailing: Jun. 30, 2011; 4 pages.
Office Action corresponding to Japanese Patent Application No. 2008-547210 dated Apr. 27, 2011; 3 pages.

* cited by examiner

*Primary Examiner* — Marcos Batista
(74) *Attorney, Agent, or Firm* — Myers Bigel Sibley & Sajovec, P.A.

(57) ABSTRACT

A mobile terminal includes a processor operatively associated with a radio communications circuit and configured to store a podcast including an embedded link to content outside of the mobile terminal. The processor is further configured to control activation of the embedded link responsive to a communications status of the mobile terminal and/or a configuration of a user interface of the mobile terminal. For example, the communications status may include availability of communications between the mobile terminal and a storage location of the content, or presence of a particular call and/or a message. The user interface configuration may include, for example, a current display mode or physical arrangement of the terminal.

2 Claims, 5 Drawing Sheets

MOBILE TERMINALS, METHODS AND COMPUTER PROGRAM PRODUCTS INCORPORATING PODCAST LINK ACTIVATION CONTROL

BACKGROUND OF THE INVENTION

The present invention relates to mobile terminals and, more particularly, to control of mobile terminals in relation to media content.

Mobile terminals are typically purchased by a user to obtain access to wireless phone services through a cellular network telecommunications provider. However, capabilities of mobile terminals have multiplied to the point where they can perform functions previously found only in, for example, media players, personal computers (PCs) and personal digital assistants (PDAs).

For example, mobile terminals with multimedia capabilities are now available. For example, a mobile terminal may be provided with a radio tuner capability. Some mobile terminals also have the capability to play digital audio and/or video files, such as MP3 files and "podcasts," which may be downloaded from internet websites or from storage media.

Podcasting is a technique for publishing content, typically audio programs, via the Internet. Podcasting typically uses a "feed," such as an XML RSS (e.g., Really Simple Syndication) or Atom formatted file, to deliver an enclosed file. Independent producers, for example, can use podcasting to create self-published, syndicated "shows." Listeners may subscribe to feeds using aggregator software, which periodically checks for and downloads new content. Typical aggregators enable a user to copy podcasts to portable music players or other portable media players. A podcast is commonly viewed as including audio content, although the podcast concept may be viewed as encompassing audio and/or visual content transmission. "Enhanced" podcasts may further include images (e.g., JPG files) and HTML (hypertext markup language) links.

SUMMARY OF THE INVENTION

According to some embodiments of the present invention, a mobile terminal includes a radio communications circuit and a processor operatively associated with the radio communications circuit and configured to store a podcast including an embedded link to content outside of the mobile terminal. The processor is further configured to control activation of the embedded link responsive to a communications status of the mobile terminal and/or a configuration of a user interface of the mobile terminal. For example, in some embodiments, the communications status may include availability of communications between the mobile terminal and a storage location of the content, or presence of a particular call and/or a message. In further embodiments, the mobile terminal further comprises a display having a plurality of display modes, and wherein the processor may be configured to control activation of the embedded link responsive to a current display mode of the mobile terminal. For example, the mobile terminal may include a housing that is changeable among a plurality of physical arrangements, and the processor may be configured to control activation of the embedded link responsive to a current physical arrangement of the housing.

In some embodiments, the processor may be configured to enable or disable selection of the link responsive to the communications status and/or the configuration of the user interface. The processor may be configured to control activation of the embedded link during playback of the podcast based on the communications status and/or the configuration of the user interface of the mobile terminal.

In further embodiments of the present invention, methods of operating a mobile terminal are provided. A podcast is stored in a mobile terminal, the podcast including an embedded link to content stored outside of the mobile terminal. Activation of the embedded link is controlled responsive to a communications status of the mobile terminal. For example, the communications status may comprise presence of a call and/or a message and/or availability of communications between the mobile terminal and a storage location of the content. Controlling activation of the embedded link may include enabling or disabling selection, e.g., automatically and/or by user input, of the link responsive to the communications status. Mobile terminals and computer programs performing such operations are also provided.

Further embodiments of the present invention provide methods in which a podcast is stored in a mobile terminal, the podcast including an embedded link to content stored outside of the mobile terminal. Activation of the embedded link is controlled responsive to a configuration of a user interface of the mobile terminal. For example, the mobile terminal may have a plurality of display modes, and controlling activation of the embedded link responsive to a configuration of a user interface of the mobile terminal may include controlling activation of the embedded link responsive to a current display mode of the mobile terminal. In further embodiments, the mobile terminal may include a housing changeable among a plurality of physical arrangements, and controlling activation of the embedded link responsive to a configuration of a user interface of the mobile terminal may include controlling activation of the embedded link responsive to a current physical arrangement of the housing of the mobile terminal. Controlling activation of the embedded link responsive to a configuration of a user interface of the mobile terminal may include enabling or disabling selection of the link based on the configuration of the user interface. Mobile terminals and computer program products configured to perform such operations are also provided.

DETAILED DESCRIPTION OF EXEMPLARY EMBODIMENTS

Figure 1:
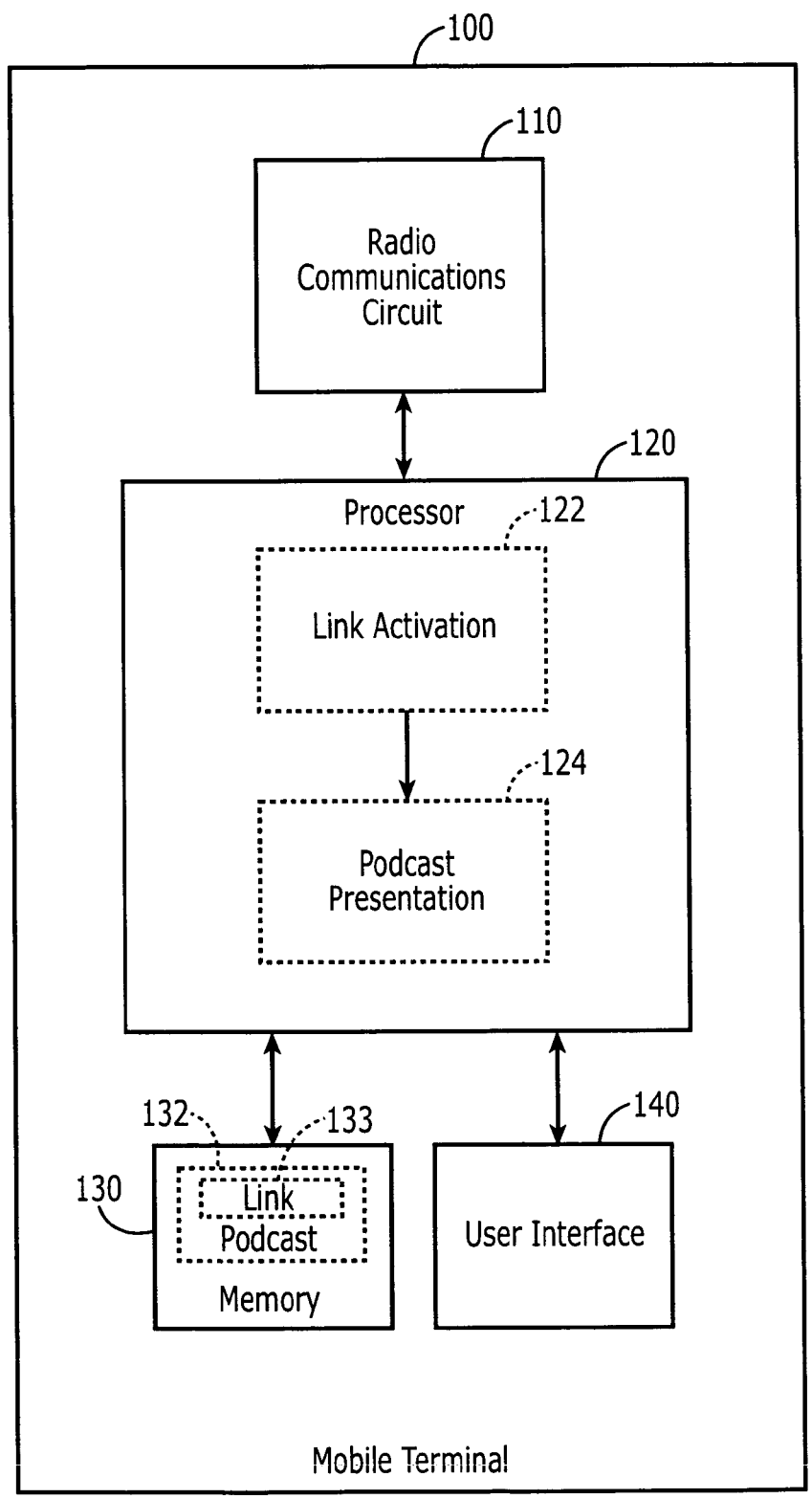
FIG. 1 is a schematic block diagram of a mobile terminal illustrating selective podcast link activation according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention described herein relate to controlling activation of embedded links in podcasts. As used herein, "podcast" includes, but it not limited to, any audio and/or visual content file (or collection of files) configured to be downloaded to a portable electronic device (e.g., an iPod® or other music player, a personal digital assistant (PDA), a mobile terminal or other portable electronic device) for playback on the portable device. As used herein, "mobile terminal" includes any portable electronic device configured to act as a terminal in a communications system and may include, but is not limited to, cellular telephones, as well as PDAs, notebook computers, media player devices and other personal electronic devices with mobile communications capabilities.

Some embodiments of the present invention arise from a realization that, because mobile terminals, such as cellular telephones, have communications ability to access content in embedded podcast links, it may be advantageous to selectively activate such links based on the manner in which the terminal is currently deployed. For example, a user having a "clamshell" or "flip" type cellular phone with podcast playback capability may be listening to a podcast while engaged in an activity, e.g., jogging or walking, in which his or her phone is in a "closed" position. In such cases, it may be advantageous to disable podcast links in the podcast. For example, if such links automatically are selected upon playback of the podcast, the terminal may needlessly attempt to download visual content, such as pictures associated with the podcast, even though the user will be unable to see the downloaded content. This could result in a waste of system bandwidth. In addition, in such a configuration, the user may be unable to select displayed links, e.g., hyperlinks, making activation of the links infeasible. In other scenarios, the activation of links may be unnecessary due to lack of availability of appropriate communications resources for retrieving the referenced material. For example, the user's terminal may be in a poor coverage area or in a roaming mode that would entail undesirable usage charges. The user's terminal may be in an "airplane" mode, wherein the terminal is enabled for gaming or playing podcasts, but radio functions are disabled. In other scenarios, the terminal may capable of radio signaling, but may have insufficient memory capacity to store content referenced by a link. In still other scenarios, it may be desirable to use the terminal's communications capability to selectively authorize use of embedded links.

FIG. 1 illustrates a mobile terminal 100 according to some embodiments of the present invention. The mobile terminal 100 includes a radio communications circuit 110, which is configured to conduct radio communications with entities, e.g., a cellular telephone network or wireless local area network (WLAN), external to the mobile terminal 100. The mobile terminal 100 also includes a processor 120, which is operatively associated with the radio communications circuit 110, e.g., the processor 120 may transmit and receive data to and from a communications network via the radio communications circuit 110. The processor 120 is also operatively associated with a memory 130, which may be configured to store, for example, program code that executes on the processor 120 and/or data manipulated by the processor 120. A user interface 140 is also operatively associated with the processor 120, and may include, for example, a display, keypad, touchpad, vibrator, light emitting diode (LED), speaker, and the like. In some embodiments, the mobile terminal 100 may be configured to provide a plurality of different user interface modes, such as different display modes or different physical configurations as provided, for example, in "flip" phones, "swivel" phones, or terminals with flip-down keyboards and other movable user interface features. In such cases, the user interface 140 may also include means, such as sensors, switches and the like, for determining a current user interface configuration of the terminal 100.

In the illustrated embodiments, the processor 120 may be configured to receive (download) a podcast 132, e.g., via the radio communications circuit 110, and to store the podcast in the memory 130. The downloaded podcast 132 includes an embedded link 133, e.g., a hyperlink or other link to content outside of the podcast. For example, the link 133 may be a link to a website or other storage location that holds content that supplements audio and/or visual content of the podcast. A link activation control application 122 may be resident at the processor 120, and may control activation of the link 133 as, for example, the podcast 132 is presented by a podcast presentation application 124. It will be appreciated that the link activation control application 122 and the podcast presentation application 124 may be sub-applications of an integrated application, e.g., a media presentation application.

In some embodiments of the present invention, control of link activation may involve actually triggering retrieval of the content identified by the link upon a change in the communications status of the terminal and/or a change in a user interface configuration of the terminal. In some embodiments of the present invention, podcast link "activation" may involve enabling or disabling selection of a link, so that content may be retrieved responsive to some other event. For example, an embedded link may be a hyperlink that is activated by displaying it during playback, such that it may be selected by a user of the mobile terminal to retrieve content identified by the link. The link could also be a link that may be automatically "selected" as the podcast is played to retrieve the identified content. It will be appreciated that in addition to such link activation control techniques, link activation may also be made dependent on other events or actions. For example, in some embodiments of the present invention, activation of a link may be dependent on a previous activation of another link.

In some embodiments, control of link activation may entail, for example, control of user interface characteristics, such as allowing or suppressing display of the link 133 on a display of the terminal 100 and/or enabling or disabling of certain user input capabilities (e.g., suppression of keypad or other inputs). The link activation control application 122 may, for example, control activation of the link 133 responsive to, for example, a communications status of the mobile terminal 100. Such communications status may include, for example, the availability of communications (e.g., the presence of cellular or wireless LAN service and/or the bandwidth or other qualities of such service) between the terminal 100 and a location at which content referenced by the link 133 is resident or the presence of a certain call and/or text message (e.g., a security authorization message enabling use of the link 133). According to further embodiments, the link activation control application 122 may control activation of the link 133 responsive to a user interface configuration of the mobile terminal 100. For example, the link activation control application 122 may control activation of the link based on a display mode and/or physical arrangement of the mobile terminal 100.

Figure 2:
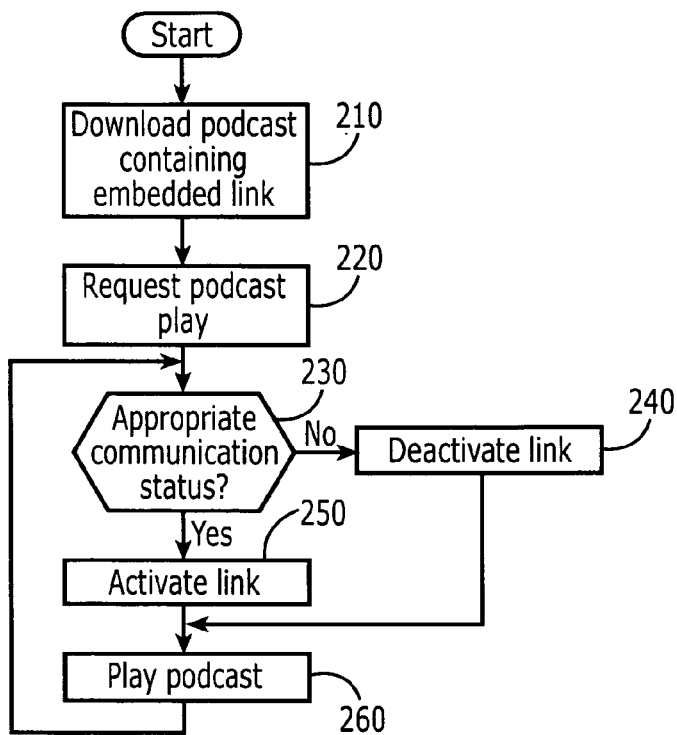
FIGS. 2 and 3 are flowcharts illustrating operations for selective podcast link activation in a mobile terminal according to various embodiments of the present invention.

FIG. 2 illustrates exemplary operations for controlling podcast link activation according to some embodiments of the present invention. A mobile terminal downloads and stores a podcast including an embedded link (block 210). A user of the terminal requests playback of the podcast, e.g., by a keypad input (block 220). The mobile terminal determines whether an appropriate communications status exists for activation of the link (block 230). For example, in some embodiments, the terminal may determine whether appropriate cellular or wireless LAN service is available that will support access to content referenced by the link. In other embodiments, the terminal may determine whether an appropriate call has been received or is in progress and/or if an appropriate voice or text message has been received. If the communications status is appropriate, the mobile terminal activates the link (block 250), e.g., makes the link available for automatic and/or user selection during playback of the podcast (block 260). If not, the link is deactivated (block 240), such that it will not be triggered during playback of the podcast (block 260). As indicated, during playback of the podcast, the terminal may (e.g., periodically) check the current communications status (block 230) and, based on this determination, may either activate and/or deactivate the embedded link.

Figure 3:
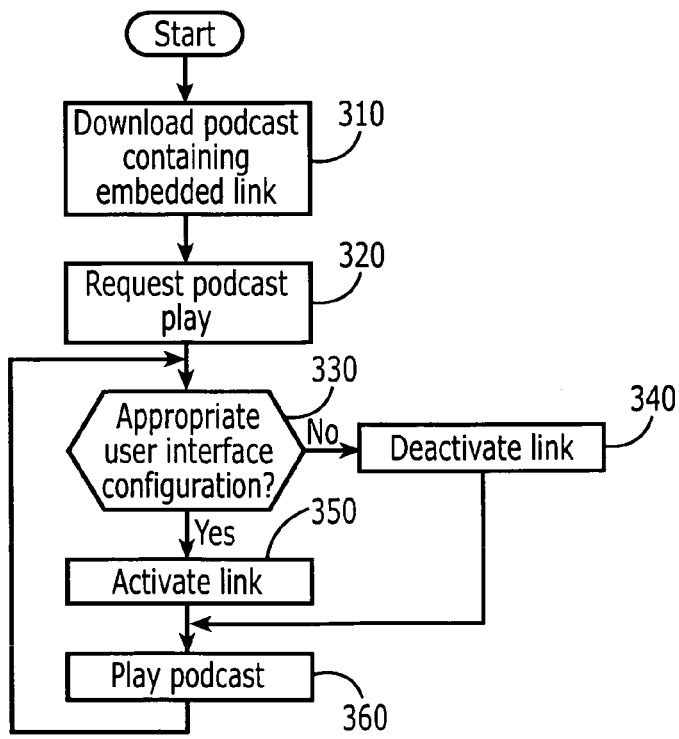

FIG. 3 illustrates exemplary operations for controlling podcast link activation according to further embodiments of the present invention. A mobile terminal downloads and stores a podcast including an embedded link (block 310). A user of the terminal requests playback of the podcast, e.g., by a keypad input (block 320). The mobile terminal determines whether the terminal is in an appropriate user interface configuration for activation of the link (block 330). For example, in some embodiments, the terminal may determine whether it is currently in a display mode or physical arrangement suitable for activation of the link. If the user interface configuration is appropriate, the mobile terminal activates the link (block 350), e.g., makes the link available for automatic and/or user selection during playback of the podcast (block 360). If not, the link is deactivated (block 340), such that the link will not be activated during playback of the podcast (block 360). As indicated, during playback of the podcast, the terminal may (e.g., periodically) check the current user interface configuration (block 330) and, based on this determination, may either activate and/or deactivate the embedded link.

Figure 4A:
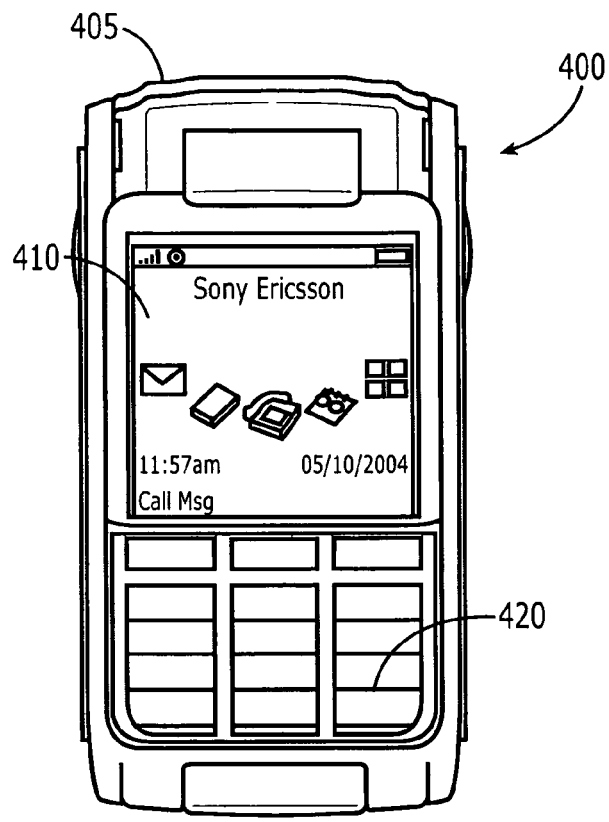
FIGS. 4 and 5 illustrate exemplary user interface reconfigurations for mobile terminals that may be used to control podcast link activation according to some embodiments of the present invention.
Figure 4B:
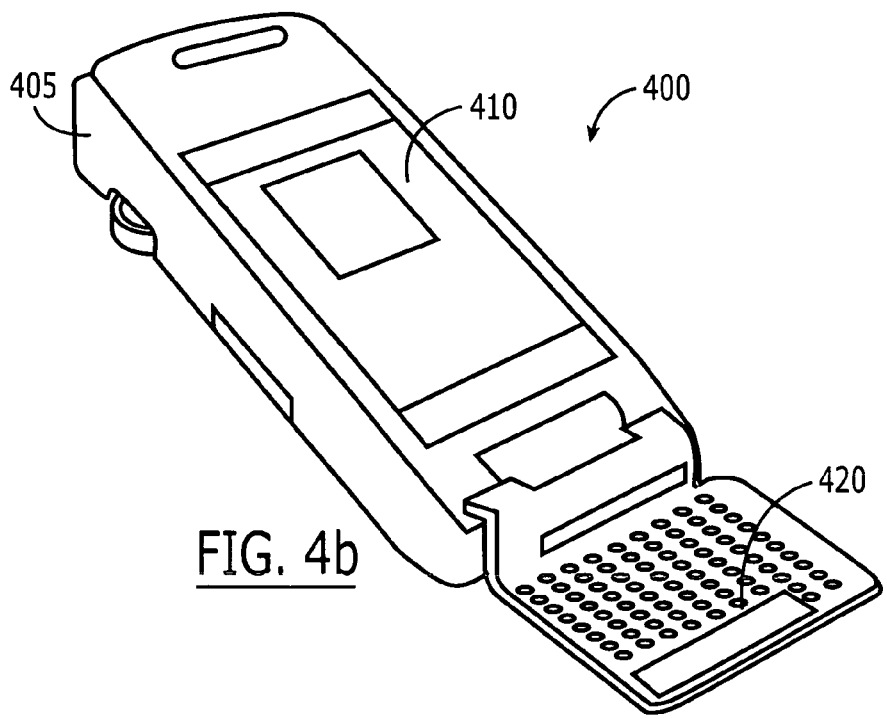

FIGS. 4a and 4b illustrate a mobile terminal 400 that is capable of multiple physical arrangements, and which may utilize podcast link activation control as discussed above. As shown in FIG. 4a, a housing 405 of the terminal 400 includes a flip-down keypad 420 of the mobile terminal 400 that is deployed in a closed position in a first mode, such that the keypad 420 covers a portion of the display 410 of the terminal 400. In this mode, the terminal 400 controls graphic content on the display 410 so that a reduced screen area is used. In such a mode, it may be desirable to deactivate an embedded podcast link, as display of the link may waste valuable space on the reduced active area of the display 410. In other cases, it may be desirable to deactivate links due to obstruction of user access to a particular key or other user input device on a fact of the flip-down keypad 420 that faces the body of terminal housing 405. Referring to FIG. 4b, upon rearrangement of the terminal 400 by flipping down the keypad 420, additional screen space on the display 410 and keys on the "back" of the flip-down keypad 420 become accessible. In such case, it may be appropriate to activate (e.g., display and/or enable selection of) an embedded podcast link.

Figures 5A, 5B:
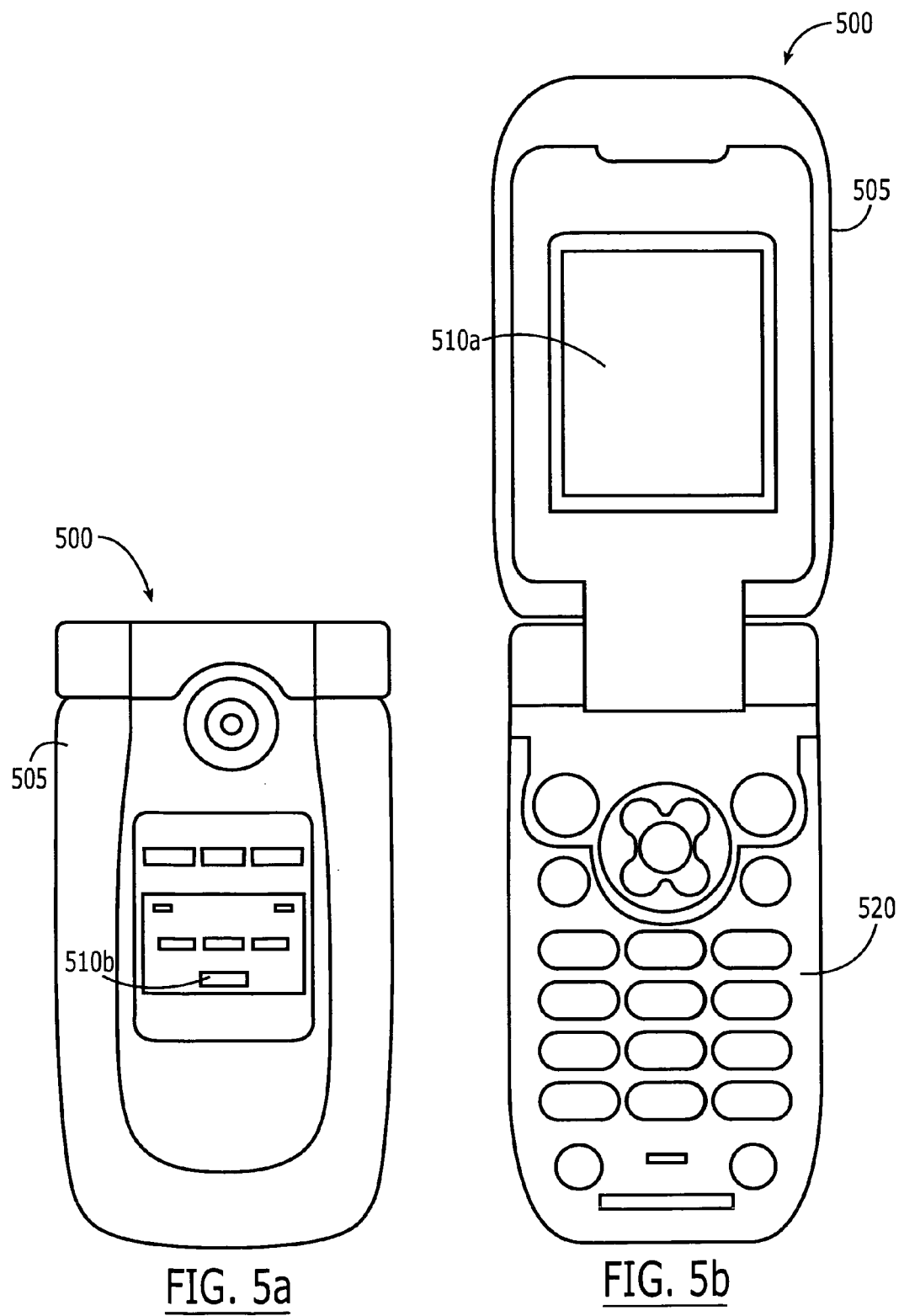

FIGS. 5a and 5b illustrate another example of use of physical arrangement and/or display mode of a mobile terminal to control podcast link activation according to further embodiments of the present invention. A "clamshell"-type mobile terminal 500 includes a housing 505 holding primary and secondary displays 510a, 510b and a keypad 520. The housing 505 is configured to be changeable between a closed position, in which the primary display 510a and keypad 520 are obscured, and an open position in which the primary display 510a and the keypad 520 are accessible. In the closed position, it may be desirable to deactivate podcast links because of, for example, the smaller area of the secondary display 510b and/or the inaccessibility of the keypad 620. Once the housing 505 is opened, however, it may be desirable to activate podcast links.

Figure 6:
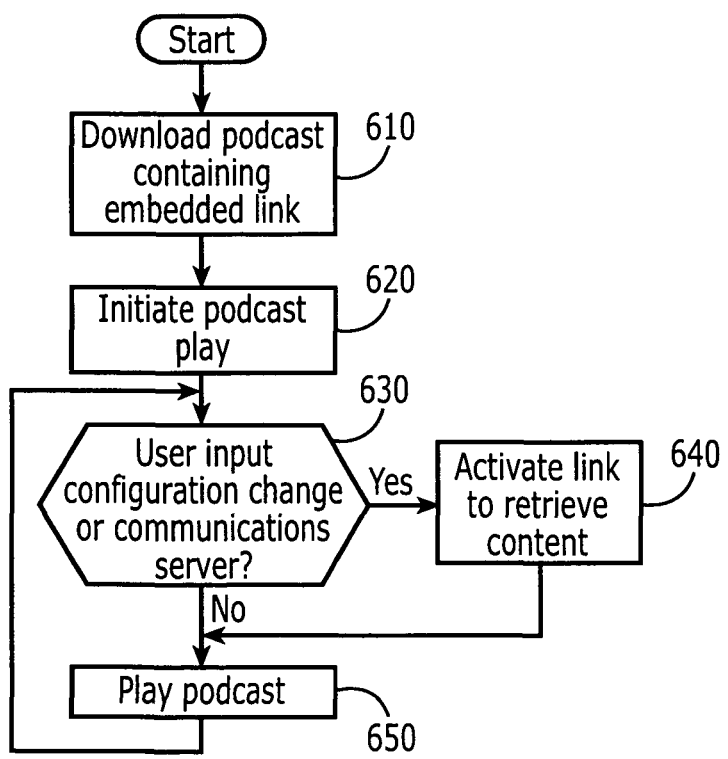
FIG. 6 is a flowchart illustrating operations for selective link activation in a mobile terminal according to further embodiments of the present invention.

FIG. 6 illustrates exemplary operations for controlling podcast link activation according to further embodiments of the present invention. A mobile terminal downloads and stores a podcast including an embedded link (block 610). Playback of the podcast is initiated, e.g., by a keypad input (block 620). During playback, if the mobile terminal detects a change in communications status (e.g., receipt of a certain call or text message) and/or a change in a user interface configuration (e.g., a change in display mode or physical arrangement of the terminal), the terminal activates the link to retrieve the content identified by the link (blocks 630, 640). As indicated, as playback of the podcast continues, additional link activation may occur (blocks 650, 630, 640). It will be appreciated that the examples shown in FIGS. 2-6 are provided for purpose of illustration, and that podcast link activation may be controlled in a number of other ways within the scope of the present invention.

The present invention may be embodied as methods, systems, and computer program products. Accordingly, the present invention may be embodied in hardware, software or combinations thereof. Furthermore, the present invention may take the form of a computer program product on a computer-readable storage medium having computer program code embodied in the medium. Applicable storage media include, but are not limited to, hard disks, CD-ROMs, optical storage devices and magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language.

The program code may execute entirely on the user's computer (i.e., controller of the user's mobile terminal), partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention has been described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and schematic diagrams of herein illustrate the architecture, functionality, and operations of some embodiments of the present invention. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A mobile terminal comprising:
a radio communications interface circuit; and a processor operatively associated with the radio communications circuit and configured to store a podcast including an embedded link to content outside of the mobile terminal and to control activation of the embedded link responsive to a communications status of the mobile terminal and/or a configuration of a user interface of the mobile terminal, wherein the mobile terminal further comprises a display having a plurality of display modes, and wherein the processor is configured to control activation of the embedded link responsive to a current display mode of the mobile terminal.

2. A method comprising:
storing a podcast in a mobile terminal, the podcast including an embedded link to content stored outside of the mobile terminal; and controlling activation of the embedded link responsive to a configuration of a user interface of the mobile terminal, wherein the mobile terminal has a plurality of display modes, and wherein controlling activation of the embedded link responsive to a configuration of a user interface of the mobile terminal comprises controlling activation of the embedded link responsive to a current display mode of the mobile terminal.

* * * * *